April 12, 1966     F. D. WERNER     3,245,260

TEMPERATURE SENSOR FOR HIGH VELOCITY LIQUID FLOWS

Filed Oct. 29, 1962

INVENTOR.
FRANK D. WERNER
BY
Dugger Braddock Johnson & Westman
ATTORNEYS

United States Patent Office 3,245,260
Patented Apr. 12, 1966

3,245,260
TEMPERATURE SENSOR FOR HIGH VELOCITY
LIQUID FLOWS
Frank D. Werner, Minneapolis, Minn., assignor to Rosemount Engineering Company, Minneapolis, Minn., a corporation of Minnesota
Filed Oct. 29, 1962, Ser. No. 233,685
4 Claims. (Cl. 73—343)

The present invention has relation to temperature sensors and more particularly to a unique type of temperature sensor for utilization in liquids moving under high velocity which minimizes the frictional heating effect of the liquid.

Presently in the measurement of temperatures of high velocity liquids, particularly when they are viscous, the effect of frictional heating of the sensor can cause great error in the temperature reading. While the characteristics of frictional heating have been clearly recognized by specialists in heat transfer, temperature sensors which compensate for this effect are not available commercially.

The present invention presents a temperature sensor for use in liquids moving under high velocities. The temperature sensor is constructed to minimize the effect of frictional heating of the sensor and permit accurate direct readings of the static temperature of the liquid. The sensor unit is simply constructed and yet gives highly accurate direct readings.

It is an object of the present invention to present a temperature sensor that gives accurate temperature readings of high velocity liquids.

It is a further object of the present invention to present a temperature sensor for use in high velocity liquids which directly indicates the static temperature of the liquid.

It is another object of the present invention to present a temperature sensor for use with high velocity liquids which eliminates frictional heating effects on the sensor.

It is another object of the present invention to present a temperature sensor that can be easily installed into a conduit or duct carrying high velocity liquids.

It is a still further object of the present invention to present a simply constructed and low cost temperature sensor for use in high velocity liquids.

Other and further objects are those inherent in the invention herein illustrated, described, and claimed, and will become apparent as the description proceeds.

To the accomplishment of the foregoing and related ends, this invention then comprises features hereinafter fully described and particularly pointed out in the claims, the following description setting forth in detail certain illustrative embodiments of the invention, these being indicative, however of but a few of the various ways in which the principles of the invention may be employed.

The invention is illustrated by reference to the drawings, in which corresponding numerals refer to the same part, and in which.

Figure 1:
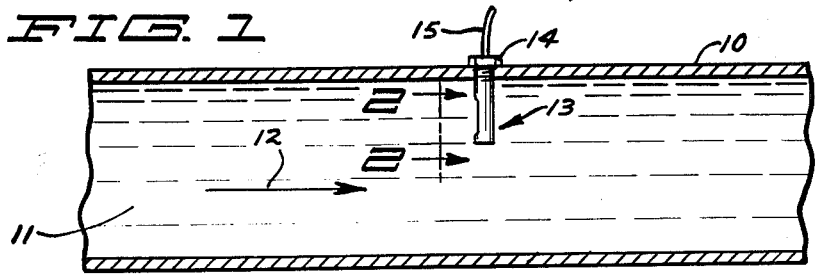
FIG. 1 is a vertical sectional view of a duct carrying liquid moving under high velocity and having a temperature sensor made according to the present invention installed therein.

Referring to the drawings and the numerals of reference thereon, a pipe or duct 10 carries a liquid illustrated in dotted lines at 11 which is moving in direction as indicated by arrow 12. The liquid is flowing at a relatively high velocity, for example, 100 feet per second. A temperature sensor unit 13 is inserted into the duct 10 and is sealingly fastened to the wall of the duct with a nut 14. Wires 15 lead from the temperature sensor unit to suitable instrumentation which indicates the temperature of the sensor.

Figure 2:
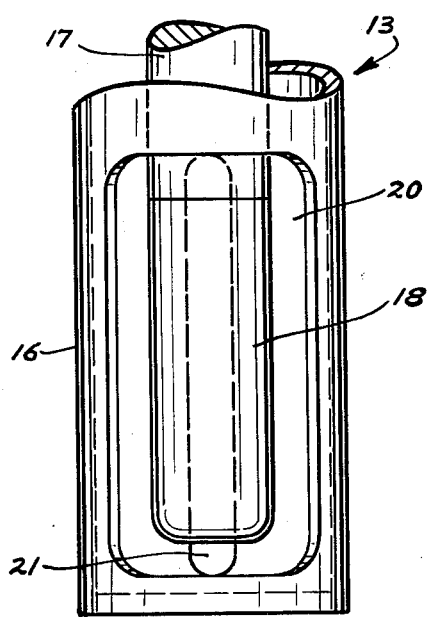
FIG. 2 is a fragmentary enlarged front elevational view of a temperature sensor made according to the present invention and taken as on line 2—2 in FIG. 1.
Figure 3:
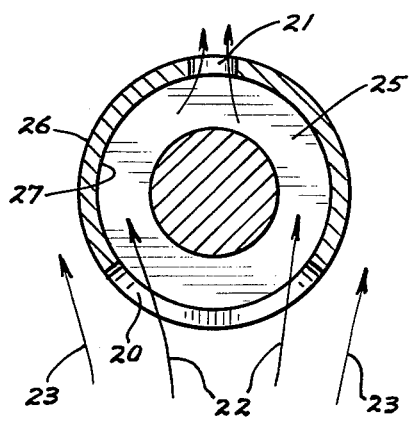
FIG. 3 is a transverse cross sectional view of the device of FIG. 2.

Referring to FIGS. 2 and 3, and a first form of the invention, the temperature sensor unit 13 comprises a cylindrical outer housing 16 in which a temperature sensing element 17 is inserted. The temperature sensing element has a temperature sensitive area illustrated at 18.

The cylindrical outer housing 16 is provided with an inlet opening 20 which is positioned facing the flow of liquid 11 and is directly in front of the sensitive area 18 of the sensing element 17. An exhaust or outlet opening 21 is also provided in the side of the cylindrical housing 16 away from the direction of flow in the duct. The element 17 is spaced from housing 16 and the space between the two forms a chamber 25.

As can be seen in FIG. 3 liquid flowing through duct 10 enters chamber 25 in direction as indicated by arrows 22. Other portions of the liquid flow around the outer housing 16 as indicated by arrows 23. The outlet opening 21 is relatively small and liquid entering chamber 25 is retarded in flow so that the flow through chamber 25 is slow. The liquid going around the outside of the cylindrical outer housing continues at high velocity. The liquid in chamber 25 between the outer cylindrical housing 16 and the temperature sensing element 17 is slowed sufficiently so that it does not cause frictional heating of the sensing element when it moves past the element. The relationship in size between inlet opening 20 and outlet opening 21 is such that the liquid in chamber 25 is moving at a velocity sufficiently low to substantially eliminate the frictional heating effect. The actual velocity below which the frictional heating effect is negligible is different for different liquids, being largely dependent upon viscosity, specific heat and thermal conductivity of the liquid.

As liquids are relatively incompressible the compression effect on the temperature is negligible and the temperature sensor thus measures the temperature of the undisturbed liquid in the duct, although the presence of the sensor unit in the duct causes considerable flow disturbance.

The liquid passing along the outer surfaces 26 of the cylindrical housing 16 causes frictional heating of this surface. The heat is conducted to the liquid flowing against the inner surfaces 27 of the cylindrical outer housing 16 and this heated liquid is carried away through opening 21 before the heat is conducted to the temperature sensing element. Sensing element 17 may be any type of immersion temperature sensing element, for example thermocouples, resistance temperature sensors or mercury thermometers.

Figure 4:
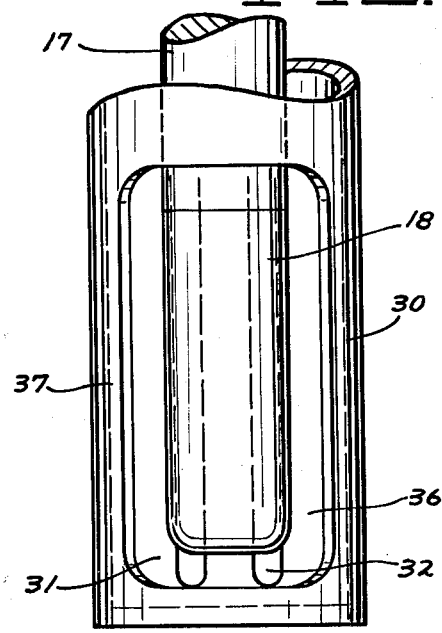
FIG. 4 is a front elevational view of a temperature sensor made according to a second form of the present invention and taken as on line 2—2 in FIG. 1.
Figure 5:
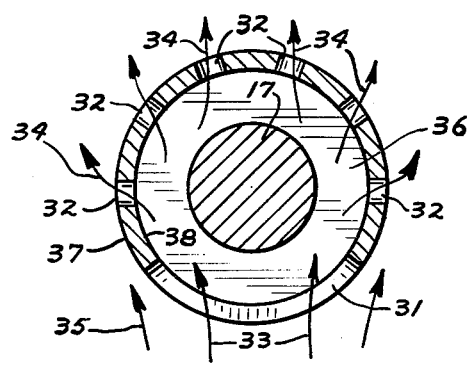
FIG. 5 is a transverse cross sectional view of the device of FIG. 4.

FIGS. 4 and 5 illustrate a second form of the present invention. An outer cylindrical housing 30 in this form of the invention has a temperature sensing element 17 concentric therewith and spaced from the interior surfaces thereof as in the first form of the present invention. The cylindrical outer housing 30 also has a provided enlarged inlet opening 31 which faces the flow of liquid in the duct 10 and has a plurality of outlet slots or openings 32 on the down stream side of the cylindrical housing. The area, position and shape of the outlet openings is such that the flow through housing 30 is constricted. As seen in FIG. 5 liquid will enter the inlet opening 31 as indicated by arrows 33 and will be again constricted and slowed as it moves through a chamber 36 in the cylindrical outer housing and will be discharged out through openings 32 as indicated by arrows 34. Also, a portion of the liquid will go around the outside of the housing 30 as indicated by arrows 35 and this liquid is moving at a high velocity, as is the liquid in the duct.

With a plurality of openings 32, arranged as shown, the frictional heating effect on the temperature sensing element 17 is even less than in the first form of the invention. The liquid within the chamber 36 of the sensing unit is slowed to a point where the frictional heating effect on the sensor is negligible. The frictional heating on the outer surfaces 37 of the cylindrical housing 36 due to the high velocity liquid in duct 10 is conducted to the boundary layer of liquid on the inner surfaces 38 of the cylindrical housing. The boundary layer of liquid is heated by conduction but is discharged immediately out through the adjacent openings 32 and the frictional heating effect on the cylindrical housing does not affect the reading of the temperature sensing element.

Because of the improved boundary layer control in the second form of the invention this form will result in less effect on the sensing element than the first form, for same diameter of outer housing. Conversely, a smaller diameter outer housing may be utilized in the second form of the present invention without obtaining more error due to conduction of heat from the outer housing to the sensing element than in the first form of the invention.

It should be noted that the outer housings need not be cylindrical, as shown in the specification, but must be of some type of construction in which there is a constriction on the down stream or lower pressure side of the sensing element. This constriction slows the flow of liquid in a localized area around the sensing element.

If desired, in the second form of the invention the rearmost exit ports may be smaller than those along the sides to provide for greater discharge along the sides of the outer housing. This aids in control of the boundary layer of liquid within the outer housing.

It is important that the exit ports 32 must not be located in a position where the pressure on the outside of the outer housing is higher than on the inside. This could result if the upstream or inlet opening were relatively small compared to the exit openings.

An auxiliary outer housing may be placed over the housings illustrated to further reduce the frictional heating effect, if desired.

As many widely apparently different embodiments of this invention may be made without department from the spirit and scope thereof, it is to be understod that I do not limit myself to the specific embodiments herein.

What is claimed is:
1. A temperature sensor for use in measuring the static temperature of liquids moving under high velocity including an outer housing forming a chamber and located in said moving liquid, said outer housing being provided with an enlarged inlet opening facing the flow of said liquid and further being provided with at least one outlet opening of less cross sectional area than said inlet opening and positioned to provide for movement of liquid from said inlet opening through said chamber and out the outlet opening, the rate of movement of said liquid within said chamber being substantially less than the rate of movement of liquid surrounding said outer housing, and a temperature sensor element fixedly mounted with respect to said outer housing and within said chamber, said temperature sensor element being spaced from the interior wall of said outer housing and being positioned with respect to said inlet opening so that the liquid flowing from said inlet opening to said outlet opening moves across and in direct contact with said sensor element.

2. The combination as specified in claim 1 wherein said temperature sensor has a temperature sensitive portion positioned directly aligned with said inlet opening.

3. In a liquid carrying conduit with liquid moving therein at high velocity, in the order of 100 feet per second, a support housing extending into the liquid flow, said support housing having a large inlet facing upstream in the liquid and having outlets on the downstream side of the housing which are of size to restrict flow through the housing, a temperature sensor attached to the conduit and positioned in the housing and having a temperature sensitive portion located in the path of flow of liquid from the inlet to the outlet to measure the temperature of liquid flowing at a velocity substantially reduced from the velocity of the liquid in the conduit.

4. A temperature sensor for use in liquids moving under high velocity including an outer housing forming a chamber, said outer housing being cylindrical and having an inlet opening and a plurality of outlet openings, said inlet opening and said outlet openings being oriented to provide flow of liquid from the inlet opening through said chamber to said outlet openings, the total cross sectional area of said outlet openings being less than the cross sectional area of said inlet opening to thereby constrict the flow through said chamber, and a temperature sensor mounted within said chamber concentric with said outer housing and positioned spaced from the interior walls of said housing and directly in the path of liquid flowing from the inlet to the outlet openings and in contact with the flowing liquid.

References Cited by the Examiner
UNITED STATES PATENTS

| | | |
|---|---|---|
| 2,414,370 | 1/1947 | Floyd. |
| 2,930,827 | 3/1960 | Schunke. |
| 2,970,475 | 2/1961 | Werner _____ 73—204 X |
| 2,971,997 | 2/1961 | Carrico. |
| 3,075,387 | 1/1962 | Rademacher _____ 73—349 |

LOUIS R. PRINCE, *Primary Examiner.*

ISAAC LISANN, *Examiner.*